United States Patent
Levy et al.

(10) Patent No.: US 9,456,361 B1
(45) Date of Patent: Sep. 27, 2016

(54) SYSTEM, METHOD, AND COMPUTER PROGRAM FOR PERFORMING MOBILE NETWORK RELATED TASKS BASED ON PERFORMANCE DATA ACQUIRED BY AN UNMANNED VEHICLE

(71) Applicant: Amdocs Software Systems Limited, Dublin (IE)

(72) Inventors: Meir Levy, Givat-Chen (IL); Yaron Kadmon, Kfar Saba (IL); Dori Ben-Moshe, Ramat Hasharon (IL); Nadav Kremer, Hadera (IL); Baruch Pinto, Kadima (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/591,866

(22) Filed: Jan. 7, 2015

(51) Int. Cl.
*H04W 16/18* (2009.01)
*H04W 24/02* (2009.01)
*H04W 4/16* (2009.01)

(52) U.S. Cl.
CPC .............. *H04W 24/02* (2013.01); *H04W 4/16* (2013.01); *H04W 16/18* (2013.01)

(58) Field of Classification Search
CPC ... H04W 16/02; H04W 16/10; H04W 16/18; H04W 24/08

USPC .......... 455/423, 424, 425, 446, 452.1, 452.2
See application file for complete search history.

(56) References Cited

U.S. PATENT DOCUMENTS

| | | | | |
|---|---|---|---|---|
| 2007/0281634 | A1* | 12/2007 | Rao | H04W 16/10 455/103 |
| 2014/0254494 | A1* | 9/2014 | Clegg | H04W 72/082 370/329 |
| 2015/0223080 | A1* | 8/2015 | Pulleti | G05D 1/0219 455/446 |

* cited by examiner

*Primary Examiner* — Kevin Kim
(74) *Attorney, Agent, or Firm* — Zilka-Kotab, PC

(57) ABSTRACT

A system, method, and computer program product are provided for performing mobile network related tasks based on performance data acquired by an unmanned vehicle. In use, mobile device performance data associated with a geographical area is received, the mobile device performance data being acquired by one or more unmanned vehicles accessing the geographical area. Additionally, the received mobile device performance data associated with the geographical area is analyzed. Further, one or more mobile network related tasks corresponding to the geographical area are performed based on the analysis of the received mobile device performance data associated with the geographical area.

20 Claims, 4 Drawing Sheets

SYSTEM, METHOD, AND COMPUTER PROGRAM FOR PERFORMING MOBILE NETWORK RELATED TASKS BASED ON PERFORMANCE DATA ACQUIRED BY AN UNMANNED VEHICLE

FIELD OF THE INVENTION

The present invention relates to cellular networks and more particularly to improving performance of such cellular networks.

BACKGROUND

Traditionally, various aspects of deployed cellular networks are tested for verifying functionality and optimizing performance of such networks. Thus far, gathering data for such verification and optimization has been time consuming and error prone.

For example, areas of the cellular network may be inaccessible via foot traffic and/or ground vehicle traffic. Thus, data may not be gathered for these inaccessible areas and network verification/performance optimization may only be performed utilizing data associated with only a portion of the network. Moreover, collecting data in this manner is extremely time consuming.

There is thus a need for addressing these and/or other issues associated with the prior art.

SUMMARY

A system, method, and computer program product are provided for performing mobile network related tasks based on performance data acquired by an unmanned vehicle. In use, mobile device performance data associated with a geographical area is received, the mobile device performance data being acquired by one or more unmanned vehicles accessing the geographical area. Additionally, the received mobile device performance data associated with the geographical area is analyzed. Further, one or more mobile network related tasks corresponding to the geographical area are performed based on the analysis of the received mobile device performance data associated with the geographical area.

DETAILED DESCRIPTION

Figure 1:
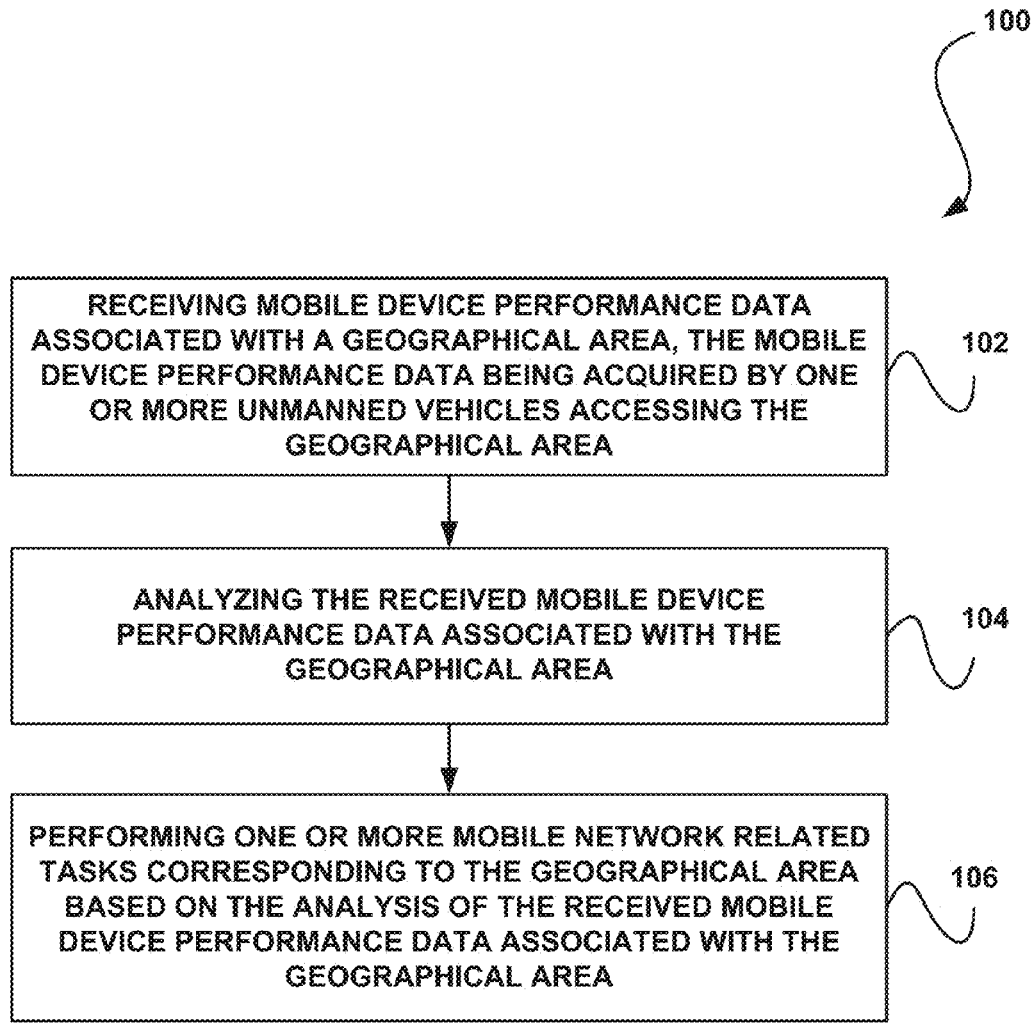
FIG. 1 illustrates a method for performing mobile network related tasks based on performance data acquired by an unmanned vehicle, in accordance with one embodiment.

FIG. 1 illustrates a method 100 for performing mobile network related tasks based on performance data acquired by an unmanned vehicle, in accordance with one embodiment.

As shown, mobile device performance data associated with a geographical area is received. See operation 102. The mobile device performance data is acquired by one or more unmanned vehicles accessing the geographical area.

The unmanned vehicle may include an unmanned ground-based vehicle or an unmanned aerial vehicle. The unmanned aerial vehicle may include any unmanned aerial vehicle (UAV), commonly known as a drone and/or a Remotely Piloted Aircraft (RPA). In various embodiments, the UAV may include a hand-launched vehicle, a machine-launched vehicle, and/or a ground-launched vehicle, etc. Moreover, the UAV may be in the form of an inflatable vehicle (e.g. a balloon, a blimp, etc.), an airplane, a propeller or multi-propeller based vehicle, and/or various other forms. The UAV may be remotely controlled and/or controlled utilizing automatic piloting system.

The unmanned ground-based vehicle may include any type of ground based vehicle, such as an indoor/outdoor vehicle (e.g. a robot, etc.) or an unmanned car, etc.

The unmanned vehicle may include various platforms for collecting mobile device performance data. For example, in various embodiments, the aerial vehicle may include various circuit boards, antennas, receivers, software, transmitters, scanners, and any other software or hardware.

The mobile device performance data collected may include any data associated with mobile devices. For example, in various embodiments, the mobile device performance data may include subscriber trace data, performance log data, dropped call data, blocked call data, radio frequency (RF) data, Evolved High-Speed Packet Access (HSPA+) service data, Long Term Evolution (LTE) service data, and/or various other data.

Further, the geographical area covered by the unmanned vehicle may include any area associated with one or more networks, indoors or outside. In one embodiment, the area may include an area defined as part of a test plan. For example, a test plan including GPS coordinates associated with the geographical area may be sent to the unmanned vehicle. The unmanned vehicle may use the received coordinates to generate a driving plan or flight plan for testing.

Additionally, in one embodiment, the test plan may indicate what data is to be collected. In various embodiments, the test plan and/or the flight plan coordinates may be updated on the ground and/or in real-time during flight.

As shown further in FIG. 1, the received mobile device performance data associated with the geographical area is analyzed. See operation 104.

Further, one or more mobile network related tasks corresponding to the geographical area are performed based on the analysis of the received mobile device performance data associated with the geographical area. See operation 106.

The analysis may include any analysis to compile the data and/or to facilitate performing of the network related tasks. The network related tasks may include any network tasks associated with analyzing the network performance, viewing network activity, and/or optimizing the network performance, etc.

For example, in one embodiment, the mobile network related tasks may include generating one or more radio frequency attribute maps. As another example, the mobile network related tasks may include investigating HSPA+ service performance. As another example, the mobile network related tasks may include investigating LTE service performance.

As another example, the mobile network related tasks may include providing detailed diagnostics for dropped calls. Still yet, the mobile network related tasks may include providing detailed diagnostics for blocked calls. As yet another example, the mobile network related tasks may include optimizing network coverage at least one network.

In various embodiments, the method 100 or a portion of the method 100 may be performed by a platform on the unmanned vehicle and/or a ground based system.

Thus, utilizing the method 100, an unmanned vehicle may receive a test plan for testing a network, fly a flight pattern or drive a pattern indicated by the test plan, and receive data from an area defined in the test plan. This data may then be sent to a system for analysis, in real-time or near real-time. Further, a new test plan may be generated based on the data and the test plan (e.g. flight plan) and data collection for the unmanned vehicle may be updated in real-time or near real-time, while the unmanned vehicle is still driving or in the air.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
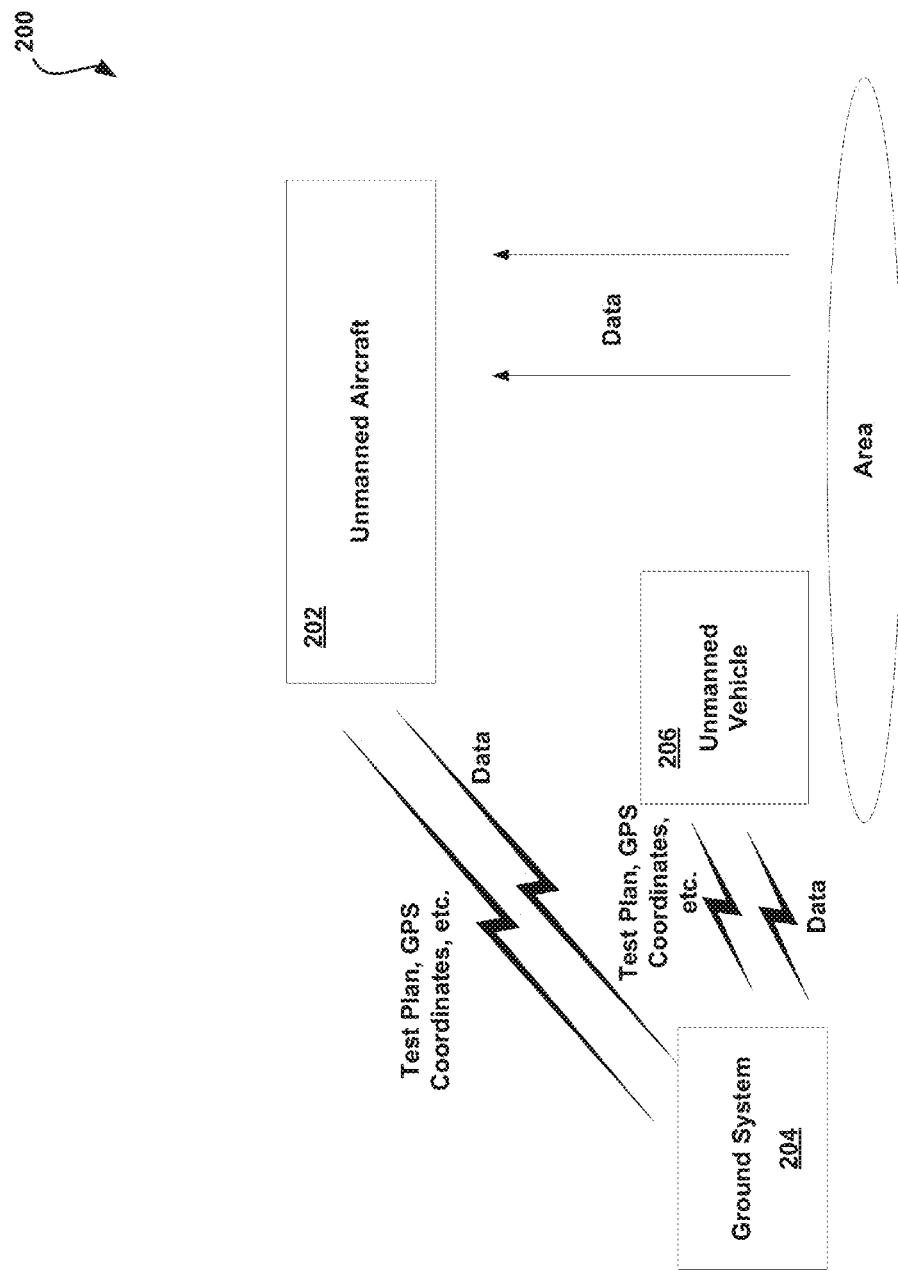
FIG. 2 illustrates a system for performing mobile network related tasks based on performance data acquired by an unmanned vehicle, in accordance with one embodiment.

FIG. 2 illustrates a system 200 for performing mobile network related tasks based on performance data acquired by an unmanned vehicle, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, one or more UAVs 202 or unmanned ground-based vehicles 206 may receive a test plan and/or flight/driving coordinates from a ground-based system 204. The flight/driving coordinates may correspond to a geographical location associated with a cellular network that is to be tested. Additionally, the test plan may indicate an amount and/or type of data the UAV 202 and/or the unmanned ground-based vehicle 206 is to collect. The test plan may be associated with a variety of tests, including testing combined with SON closed loop, I-RAT testing, special terrain testing, multiple IP application testing, and a variety of other testing.

After collecting the data, in one embodiment, the UAV 202 and/or the unmanned ground-based vehicle 206 may send the data to the ground system 204 to be analyzed. Upon analyzing the data, the ground system 204 may update the test plan and/or flight/driving coordinates and send the updated information to the UAV 202 and/or the unmanned ground-based vehicle 206 for additional data collection, etc.

For example, based on an initial analysis, a flight plan or driving plan may be generated to collect performance data over troubled areas (e.g. red spots). In this case, the UAV 202 and/or the unmanned ground-based vehicle 206 may be dispatched to collect additional data and the data may be fed back the ground system 204 for coverage optimization.

Upon analyzing the data, the ground system 204 may perform a task associated with the tested network/area. For example, the acquired data may be utilized by the ground system 204 to improve coverage in special terrains, generate RF attribute maps across multiple routes and time periods, perform powerful data service analysis that enables detailed investigation into modem HSPA+ and LTE service performance, perform advanced call events analysis that provides detailed diagnostics for drops and blocks, and/or perform drill down analysis for message by message layer 3 analysis, etc.

It should be noted that, in one embodiment, the UAV 202 and/or the unmanned ground-based vehicle 206 may include processing capability for processing at least a portion of the received data, and/or analyzing the received data.

Utilizing this system, network performance data may be obtained utilizing drone technology, as opposed to acquiring data via walking and/or driving. This allows for cost effective all terrain testing of networks, thus avoiding the discovery of QoE issues first by customers. Additionally, this allows for performance testing at different heights and around/above obstacles to measure radio signals in changing geographic conditions.

Moreover, such techniques allow for a GPS driven route test plan as opposed to a manual drive test plan based on roads. A GPS driven route allows for minimum repeats or data collection with no need for U-turns to test a specific geo-location.

Additionally, the system 200 allows for changes of a test plan on the fly, based on performance analysis. For example, SON MLB/ANR changes may be made and the UAV 202 may be utilized to verify the changes are effective. Further, in one embodiment, the system 200 may allow for immediate testing of a new handset. For example, a new handset may be plugged into the payload of the UAV 202 and tested.

The system 200 may be utilized for testing of all terrains, including indoor testing. For example, main causes for poor coverage may include terrain, obstructions, azimuth settings, EDT/MDT settings, high feeder loss, CPICH output power, and various other factors. Using the system 200, all of these various factors may be considered/analyzed as part of a test.

Moreover, the system 200 may be utilized to implement testing indoors or outdoors. For example, 70-80% of calls are made indoors, and there are sometimes problems in buildings of signal strength, signal reception (e.g. in high building multiple signals may be received from remote base stations, etc.), and interference, etc.

Accordingly, the unmanned ground-based vehicle 206 may be used as a modular approach with indoor testing capability (e.g. with a platform enhanced to support building floor plans). In this case, the unmanned ground-based vehicle 206 may operate as an autonomous system that can gather performance data across buildings that can be used to make recommendations on micro cell placement. Such techniques may be used to gather Wi-Fi performance data as well.

The unmanned ground-based vehicle 206 may be an indoor robot, etc., for indoor uses, or a self-driving car (e.g. a car utilizing a mountable option for self-driving, etc.), etc., for outdoor use.

Such vehicles 202 and 206 may include a scanner for testing various signals, indoors and outside. Moreover, the travel pattern of such vehicles 202 and 206 may be associated with determined cells of a communication service provider (e.g. small cells, etc.).

In one embodiment, the testing platform of the vehicles 202 and 206 may include a modular platform, such that: the testing payload is installed on the aerial platform to perform flight tests; the testing payload is installed on ground autonomous platform to perform indoor testing; and the testing payload may be attached to any other moving vehicle where the testing may be triggered and performed remotely.

Thus, the testing platform may be portable (e.g. it can be added to cars, etc.) and the testing platform may be autonomous. For example, the testing platform may be utilized to take accurate measurements and samplings about the strength of the signal, interferences, etc. In one embodiment, the output may be a detailed small cells installation plan (e.g.

for an indoor system). In other words, the testing platform may be used to gather information that will be used in small cells deployment projects.

Figure 3:
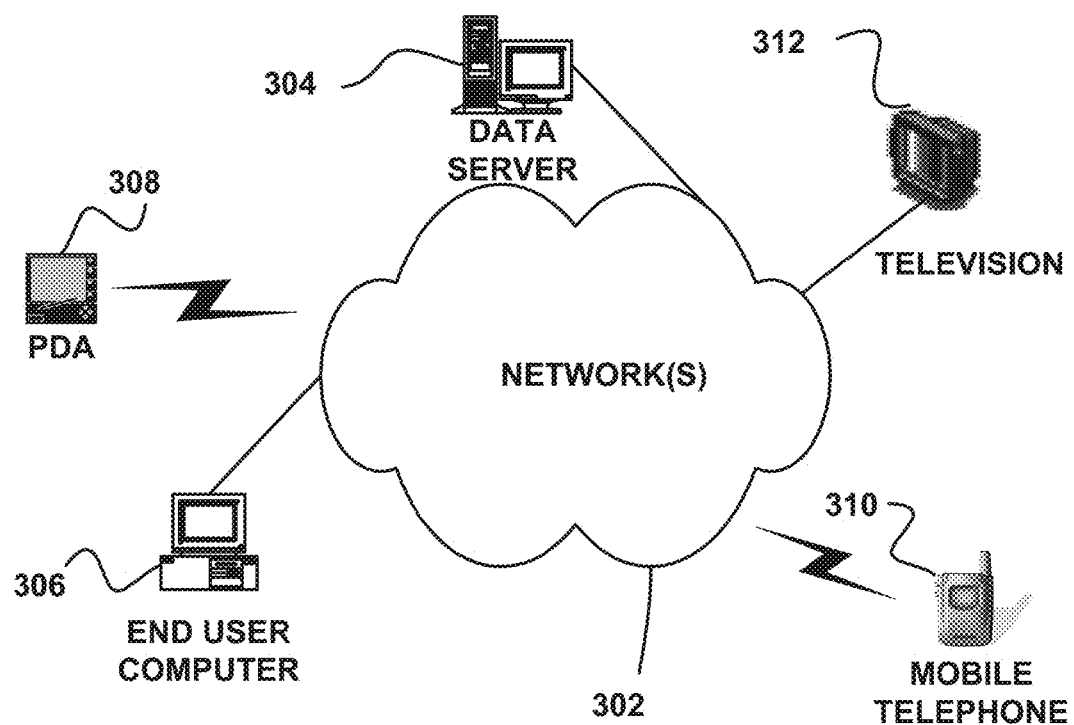
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
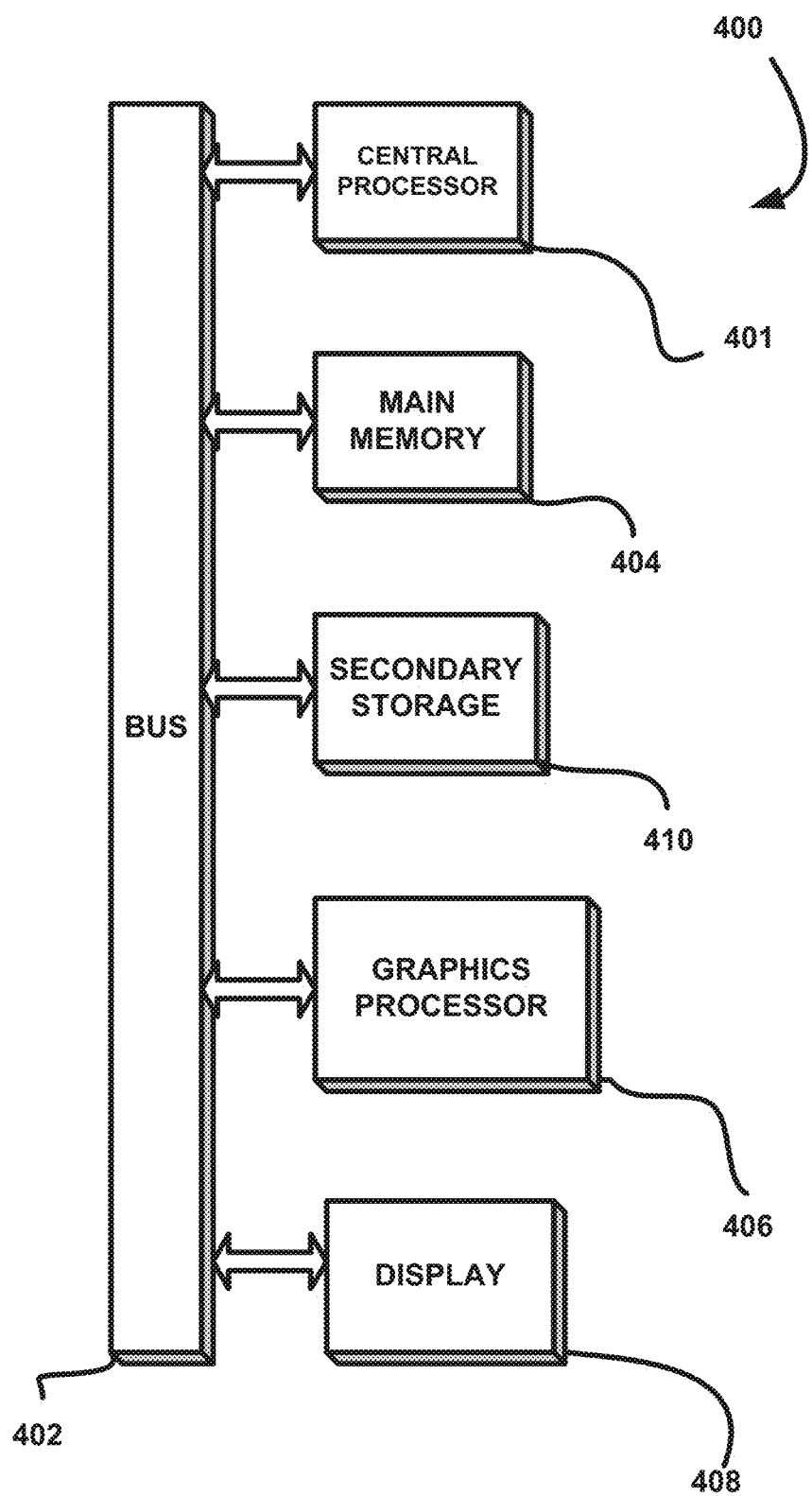
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving from one or more unmanned vehicles mobile device performance data transmitted by a plurality of different networks included within a geographical area defined as part of a test plan that further indicates the mobile device performance data to be collected from the plurality of different networks, the mobile device performance data including subscriber trace data, performance log data, dropped call data, blocked call data, radio frequency (RF) data, Evolved High-Speed Packet Access (HSPA+) service data, and Long Term Evolution (LTE) service data;
   analyzing the received mobile device performance data;
   adjusting the test plan in real time based on the analysis of the received mobile device performance data; and
   performing one or more mobile network related tasks corresponding to the geographical area based on the analysis of the received mobile device performance data.

2. The method of claim 1, wherein the one or more mobile network related tasks include generating one or more radio frequency (RF) attribute maps.

3. The method of claim 1, wherein the one or more mobile network related tasks include investigating Evolved High-Speed Packet Access (HSPA+) service performance.

4. The method of claim 1, wherein the one or more mobile network related tasks include investigating Long Term Evolution (LTE) service performance.

5. The method of claim 1, wherein the one or more mobile network related tasks include providing detailed diagnostics for dropped calls.

6. The method of claim 1, wherein the one or more mobile network related tasks include providing detailed diagnostics for blocked calls.

7. The method of claim 1, wherein the one or more mobile network related tasks include optimizing network coverage of at least one network.

8. The method of claim 1, wherein the one or more unmanned vehicles include an unmanned aerial vehicle.

9. The method of claim 1, wherein the one or more unmanned vehicles include an unmanned ground-based vehicle.

10. The method of claim 1, wherein the geographical area includes an indoor area.

11. The method of claim 1, wherein the geographical area includes an outdoor area.

12. The method of claim 1, wherein the mobile device performance data is acquired by the one or more unmanned vehicles utilizing at least one portable testing platform included with the one or more unmanned vehicles.

13. The method of claim 1, wherein the one or more mobile network related tasks include planning a small cell deployment project.

14. A non-transitory computer readable medium comprising a computer program product, the computer program product comprising computer code for:
   receiving from one or more unmanned vehicles mobile device performance data transmitted by a plurality of different networks included within a geographical area defined as part of a test plan that further indicates the mobile device performance data to be collected from the plurality of different networks, the mobile device performance data including subscriber trace data, performance log data, dropped call data, blocked call data, radio frequency (RF) data, Evolved High-Speed Packet Access (HSPA+) service data, and Long Term Evolution (LTE) service data;
   analyzing the received mobile device performance data;
   adjusting the test plan in real time based on the analysis of the received mobile device performance data; and
   performing one or more mobile network related tasks corresponding to the geographical area based on the analysis of the received mobile device performance data.

15. The computer program product of claim 14, wherein the computer program product is operable such that the one or more mobile network related tasks include generating one or more radio frequency attribute maps.

16. The computer program product of claim 14, wherein the computer program product is operable such that the one or more mobile network related tasks include investigating HSPA+ service performance.

17. The computer program product of claim 14, wherein the computer program product is operable such that the one or more mobile network related tasks include investigating LTE service performance.

18. The computer program product of claim 14, wherein the computer program product is operable such that the one or more mobile network related tasks include providing detailed diagnostics for dropped calls.

19. The computer program product of claim 14, wherein the computer program product is operable such that the one or more mobile network related tasks include providing detailed diagnostics for blocked calls.

20. A system comprising:
a memory system; and
one or more processing cores coupled to the memory system and that are each configured for:
receiving from one or more unmanned vehicles mobile device performance data transmitted by a plurality of different networks included within a geographical area defined as part of a test plan that further indicates the mobile device performance data to be collected from the plurality of different networks, the mobile device performance data including subscriber trace data, performance log data, dropped call data, blocked call data, radio frequency (RF) data, Evolved High-Speed Packet Access (HSPA+) service data, and Long Term Evolution (LTE) service data;
analyzing the received mobile device performance data;
adjusting the test plan in real time based on the analysis of the received mobile device performance data; and
performing one or more mobile network related tasks corresponding to the geographical area based on the analysis of the received mobile device performance data.

\* \* \* \* \*